April 28, 1925.                                                        1,535,634
C. E. STARR
DIFFERENTIAL DRIVING MECHANISM
Filed Oct. 18, 1920
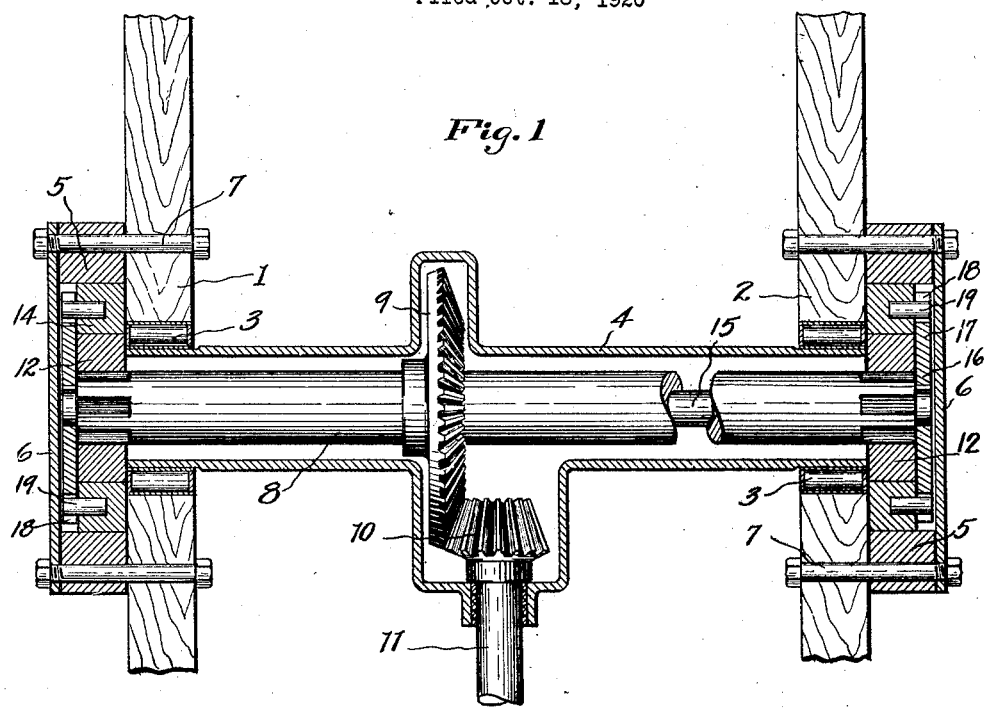
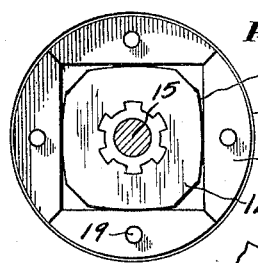
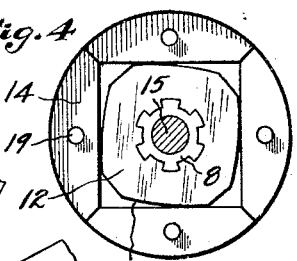
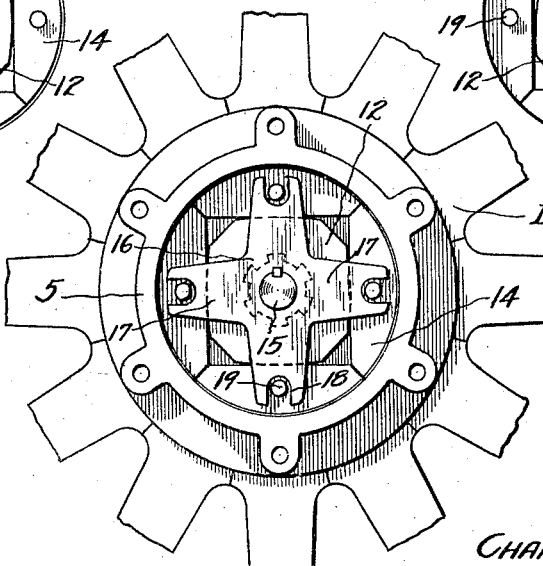
INVENTOR
CHARLES E. STARR
BY
Richard J. Cook
ATTORNEY Patented Apr. 28, 1925.

1,535,634

UNITED STATES PATENT OFFICE.

CHARLES E. STARR, OF BELLINGHAM, WASHINGTON, ASSIGNOR TO PERFECTO GEAR DIFFERENTIAL CO., OF SEATTLE, WASHINGTON, A CORPORATION OF WASHINGTON.

DIFFERENTIAL DRIVING MECHANISM.

Application filed October 18, 1920. Serial No. 417,682.

*To all whom it may concern:*

Be it known that I, CHARLES E. STARR, a citizen of the United States, and resident of the city of Bellingham, county of Whatcom, State of Washington, have invented certain new and useful Improvements in Differential Driving Mechanism, of which the following is a specification.

This invention relates to differential mechanism for motor driven vehicles such as automobiles, trucks, etc., and has for its principal object to provide mechanism whereby the driving wheels of such vehicles may be driven, yet which will permit the wheel on the outside, when the vehicle is rounding a curve, to move faster than the inside wheel through which driving is done at that time.

It is a further object of the invention to provide differential mechanism of the above character wherefrom the usual differential gears are eliminated and driving connection between the driving shaft and wheels is effected by means of the expanding of a plurality of clutch shoes against the friction surfaces of drums which are secured to the wheels.

In accomplishing these and other objects of the invention, I have provided the improved details of construction, the preferred forms of which are illustrated in the accompanying drawings, wherein—

Figure 1 is a fragmental, sectional view, taken longitudinally of the connecting shaft of wheels operated by a differential mechanism embodied by the present invention.

Figure 2 is a face view of the differential mechanism within one of the wheel drums.

Figure 3 is a detail, face view illustrating the relative positions of the driving cam and clutch blocks when the wheel wherein they are contained is running free.

Figure 4 is a similar view of these parts when the wheel is being driven.

Referring more in detail to the drawings—

1 and 2 respectively designate the central portions of the driving wheels at the opposite sides of a motor driven vehicle and which are mounted through the intermediacy of anti-friction bearings, as indicated at 3, to revolve upon the opposite ends of an axle housing 4, upon which a vehicle body and frame may be operatively mounted.

Fixed concentrically to each of these wheels, on the outer side thereof, are cylindrical drums 5 each of which is provided with a cover plate 6 and said cover plates and drums are held functionally in place by means of bolts 7 which extend through the same and are anchored to the wheel bodies.

Extending co-axially through the housing 4 with its ends terminating within the drums 5, is a tubular driving shaft 8 whereon a gear wheel 9 is fixed and which may be driven by an intermeshing gear 10 at the end of a line shaft 11 extending from the motor of the vehicle.

Keyed, or otherwise fixed onto the opposite ends of the shaft 8 are cam blocks 12, each of which, in the present construction, is of a four sided character and presents four radially curved cam surfaces 13, and disposed between these surfaces and the inner faces of the drums 5 are clutch blocks 14 which are adapted to be actuated by the said cams against the drum surfaces to effect a driving connection with the wheels of the vehicle.

Extended centrally through the driving shaft 8 and from the opposite ends of the same is a freely mounted shaft, or rod 15, and keyed to the opposite ends of this rod are spiders 16 comprising arms 17 that extend along the outer faces of the blocks 14 and at their ends are provided with slots or openings 18 into which pins 19 fixedly mounted in the blocks, are extended. These slots are slightly wider than the pins in order that the blocks in one wheel may be permitted to move forwardly or rearwardly a limited distance with respect to those of the opposite wheel.

Assuming that the parts are so constructed and assembled, the operation would be as follows: The two wheels 1 and 2 may be driven by power from the vehicle motor transmitted to the wheels through the shaft 11, gears 10 and 9 and shaft 8 which at its opposite ends has the cam blocks 12 keyed thereto.

When the vehicle is being driven in a straight line the cam surfaces 13 of the blocks 12 engage all of the clutch blocks 14 and press them against the drum surface with sufficient pressure to effect a driving connection.

Should the vehicle be driven in a curved line to the right or left, the wheel on the outside of the curve will run faster than that at the inside of the curve and this will cause the clutch blocks to move forwardly with respect to their driving cam and permit them to disengage the drum surface in so far as driving connection is concerned. This forward movement is limited to the play provided between the pins and slots in the spider arms, and this is not sufficient to allow the blocks to be carried forwardly into locking position.

The relative positions of a cam block 12 and its several clutch blocks 14 when a wheel is not being driven but is running freely ahead of the driven wheel, and when the wheel is being driven thereby, are illustrated respectively in Figures 3 and 4 of the drawing.

This mechanism, on account of the symmetry of the cam surfaces, will operate in the same manner both for forward and rearward driving.

Having thus described my invention, what I claim as new therein and desire to secure by Letters-Patent, is:

1. A differential mechanism comprising an axle housing, driving wheels revolubly mounted at the opposite ends of said housing, a drum fixed concentrically on the outer face of each of said wheels, a tubular drive shaft extended through said housing into said drums, cams fixed to said shaft within the drums, a plurality of clutch blocks disposed between the cam surfaces and inner drum surfaces and engageable by said cams to effect driving connection between the wheels and shaft, a rod extended through said tubular drive shaft, spiders fixed to the opposite ends of said rod, and pins extending from the said blocks and engageable with the spiders in such manner as to permit movement of the blocks of one wheel bodily forward with respect to those of the other wheel a limited distance sufficient to discontinue driving connection with the drum.

2. A differential mechanism comprising a pair of vehicle wheels, a concentrically mounted drum on each wheel, a driving shaft for said wheels, cams in each drum fixed on the shaft, clutch blocks interposed between the cams and the associated drum surface, a spider loosely interlocked with each set of clutch blocks, and means for rigidly connecting both spiders.

3. A differential mechanism comprising a pair of vehicle wheels, a concentrically mounted drum on each wheel, a driving shaft for said wheels, clutch blocks in each drum and providing between them a regular polygonal recess, a cam block substantially filling each of said recesses and fixed to said shaft and adapted to engage the associated clutch blocks, and means for permitting the clutch blocks of the faster moving wheel to move forwardly a limited distance relative to the clutch blocks of the other wheel.

4. A differential mechanism comprising a pair of vehicle wheels, a concentrically mounted drum on each wheel, a driving shaft for said wheels, clutch blocks in each drum and providing between them a regular polygonal recess, a cam block substantially filling each of said recesses and fixed to said shaft and adapted to engage the associated clutch blocks, a spider loosely interlocked with each set of clutch blocks, and means for rigidly connecting said spiders.

5. A differential mechanism comprising a pair of vehicle wheels, a concentrically mounted drum on each wheel, a tubular driving shaft for said wheels, clutch blocks in each drum and providing between them a regular polygonal recess, a cam block substantially filling each of said recesses and fixed to said shaft and adapted to engage the associated clutch blocks, a rod extending thru said drive shaft, and a spider loosely interlocked with each set of clutch blocks and fixed on said rod.

Signed at Seattle, Washington, this 12th day of October, 1920.

CHARLES E. STARR.